Patented Jan. 17, 1961

2,968,595
OXYGENATION OF STEROIDS BY RHIZOCTONIA AND SCLEROTIUM

George Greenspan, New Brunswick, and Carl P. Schaffner, Somerville, N.J., assignors to Rutgers Research and Educational Foundation, New Brunswick, N.J., a non-profit corporation of New Jersey No Drawing. Filed June 19, 1957, Ser. No. 666,759

21 Claims. (Cl. 195—51)

This invention relates to a method for introducing an oxygen function into steroid compounds by means of selective cultures of microorganisms. More particularly, our invention relates to a fermentation process wherein fermentation and oxygenation of steroids may be accomplished by means of certain fungi of the order Mycelia-Sterilia.

We have found that various species of several genera representative of Mycelia-Sterilia upon contact with a steroid substrate under a particular set of conditions, hereinafter described, result in the introduction of an oxygen function at C-1, C-2 and C-11 ("by oxygen function" we usually mean hydroxyl group; except only that in certain instances, we have found that a C-11 methylene group is transformed into a C-11 keto group). Although our studies indicate that the predominant products of fermentation contain one more oxygen function per molecule than the starting material, paper chromatographic evidence shows the presence of more polar materials, such as dihydroxylated compounds. Thus, we have found that Reichstein's Compound S (4-pregnene-$17\alpha,21$-diol-3,20-dione) may be transformed into one of five products depending upon the species of microorganism used, the media employed and reaction conditions. We have obtained from the fermentation of Compound S: cortisone, hydrocortisone, the 11-epimer of hydrocortisone, 1-hydroxy Compound S and 2-hydroxy Compound S in varying combinations and concentrations.

It is thus an object of this invention to provide a process for introducing a hydroxyl or keto group into an 11-desoxy steroid or introducing a hydroxyl group into the 1-position of a 1-desoxy steroid or introducing a hydroxyl group into the 2-position of a 2-desoxy steroid. It is a further object of this invention to provide for controlling the reaction so as to obtain a predominance of one of the oxygenated products over the other or others. It is an additional object of the invention to provide a process for separating mixtures of the oxygenated products so that same may be used for the purposes intended, such as therapeutics or chemical intermediates.

We have found that representatives of various genera of the order Mycelia-Sterilia are able to effect one or more of the above transformations, in particular, species of the genus Rhizoctonia and of the genus Sclerotium. We have also found that certain species of the genus Rhacodium carry out the said transformations. It thus appears that the property of oxygenating at C-1, C-2 or C-11, dependent upon conditions, is a property of the organisms of the order Mycelia-Sterilia as a whole. It is to be noted that heretofore there has been no publication on the microbiological hydroxylation of steroids at the 1- or 2-positions. Thus our process is novel in providing a means of synthesizing these useful intermediates.

The value of an 11-oxygenated compound is now well-known in the art. Many papers have been published and scores of patents been granted on methods for introducing an oxygen group in the form of a hydroxyl into the C-ring of steroids. In general, all these methods were aiming ultimately at a synthesis of cortisone and hydrocortisone and other very valuable cortical hormones containing such an oxygen function. At present, 11-oxygenation is of value in the preparation of the valuable steroids prednisone and prednisolone as well as their esters and $9\alpha$-halo derivatives. In addition, 11-oxygenated derivatives in the androstane, androstene and androstadiene series may be prepared accordingly.

These aforementioned substances are of value as anabolic agents. The 1- and 2-hydroxyl-$\Delta^4$-pregnenes having a 3-keto group and a dihydroxy acetone side chain are of value as therapeutic agents per se or as intermediates in the preparation of prednisone and prednisolone (according to U.S. Patent 2,737,518 and co-pending application, Serial No. 481,271, filed January 11, 1955). Other 1- and 2-hydroxy steroids are of value as therapeutic agents or intermediates for the preparation of pharmacologically active substances. For example, 1- or 2-hydroxy-3,11,17-triketo-4-androstene may be converted by dehydration with acid to the corresponding 1,4-androstadiene, a valuable anabolic agent. Similarly, the 1- or 2-hydroxy derivatives of progesterone are convertible by dehydration with mild acid to the progesterone diene having progestational properties. It is thus apparent that the products produced by our process are novel and may be utilized in further transformations well-known to the chemist in order to prepare valuable steroid medicaments.

Our oxygenation processes are not necessarily restricted to any particular group of steroids, except it is obvious that the steroid substrate should, at least on one of the 1-, 2- or 11-positions, contain no substituent other than hydrogen, said position then being oxidizable to hydroxyl or sometimes, in the case of 11-position, to keto. Since most of the steroids having therapeutic properties possess at least a 3-keto-$\Delta^4$-system, we prefer that our starting material contain at least such a grouping. However, such restriction is not necessary, for such a grouping may be introduced by chemical or microbiological methods well-known in the art. Our processes are not limited to members of the androstane or pregnane series, but are applicable to norandrostanes, norpregnanes, homopregnanes, bis-norcholanes and the like as well. Various unsaturations may exist in the steroid substrate, said unsaturations appearing similarly in the oxygenated product. Since our processes apparently oxygenate a steroid without effecting change in the carbon skeleton, the product produced differs from the substrate merely in the possession of one or more hydroxyl groups (or keto, as is sometime the case at C-11), without any change in the carbon skeleton, such as opening of the D-ring or splitting of a side chain. As stated, our oxygenation processes are most applicable to 3-keto-$\Delta^4$-steroid compounds which preferably have some 18 to 21-carbon atoms in the carbon skeleton. The starting materials for the reaction of this invention include such substances as cortisone, hydrocortisone, corticosterone, Compounds S, $\Delta^1$-dehydro Compound S, nortestosterone, $9\alpha$-fluorohydrocortisone, 16-dehydroprogesterone, testosterone, $\Delta^{9,11}$ Compound S, desoxycorticosterone, etc., and the $9\alpha$-halo derivatives and esters of the more common steroids.

All of the foregoing substances including analogs having similar carbon skeleton are amenable to oxygenation with Mycelia-Sterilia fungi, especially Rhizoctonia and Sclerotium in accordance with examples described later.

The microorganic biochemical oxygenation is carried out with the aid of the oxygenating fungus or the oxygenating enzymes obtainable therefrom. Organisms of the genera Rhizoctonia and Sclerotium have been known for some time and are described in detail in various compendia on the subject such as Bessey, Morphology and Taxonomy of Fungi (1950), Blakiston Company, Philadelphia. Species of this genera are readily available in public culture collections, such as the American Type Culture Collection (A.T.C.C.) in Washington; the Centraal Bureau vor Schimmelkultures (C.B.S.), Baarn, Holland; Northern Regional Research Laboratories (N.R.R.L), Peoria, Ill.; Quartermaster Corp (Q.M.), Natick, Mass.; Commonwealth Mycological Institute (C.M.I.), Kew, Surrey, England. Various species of Rhizoctonia which have been used in our transformations are sp. N.R.R.L. 2573; *solani* A.T.C.C. 10186, 10154, 10157, 10184, 10187; *zeae* C.B.S.; sp. fr. *Triticum vulgaris* C.B.S (also A.T.C.C. 13245T); *papayae* C.B.S.; *ferrugena* C.B.S. (also A.T.C.C. 13246T); *gossypii* var. *aegyptica* C.B.S.; *mucoroides* C.B.S.; *solani* from *B. cauliflora* C.B.S. (also A.T.C.C. 13248T); *lamellifera* C.M.I. 56701. Various species and strains of Sclerotium which have been used are *rolfsii* A.T.C.C. 12450; *Oryzae*, var. *irregularis* C.B.S.; sp. Q.M. 93A. In addition to the foregoing and others, Rhacodium, exemplified by *Rhacodium sellare* C.B.S. (also A.T.C.C. 13243T), has been employed. The foregoing list describes various species and strains which are obtainable from the aforementioned public culture collections. It is apparent, however, that the mycologist can isolate other organisms of the order and of the genera described from soil and other sources according to technics well-known in the art.

In carrying out the oxygenation process of the present invention, a fungus preferably of the genus Rhizoctonia or of Sclerotium such as *Rhizoctonia ferrugena* or *Sclerotium oryzae* var. *irregularis* is cultivated in a suitable nutrient medium and allowed to act upon a steroid substrate, said steroid substrate being one of those described above. During the growth of the organism under favorable conditions, the oxygen group or groups is introduced into the 1-, or 2- or 11-positions, or combinations thereof. The exact mechanism of this oxidation is unknown; however, it seems apparent that it is a result of enzymes produced by the growing organism.

A suitable nutrient medium contains a soluble source of carbon, nitrogen and mineral elements which provide carbohydrates, vitamins, minerals and nitrogenous building blocks for the organisms' growth. Sources of carbon as carbohydrates include glucose (dextrose), cerelose, starches, sucrose, as well as various natural products containing carbohydrates such as corn steep liquor, soya bean meal, soya bean oil and many other substances which have been used heretofore in fermentation processes. Usually a variety of carbon sources are used in a medium with good results.

Suitable sources of nitrogen include some of the above-named carbon sources such as corn steep liquor, soya bean meal, lactalbumin, asparagine, sodium nitrate, and other substances such as beef extract, casein, yeast extract, etc. The nitrogen source can be organic or inorganic.

In general, the mineral requirements of the organism during the fermentation process are sufficiently present in the crude natural sources of carbon or nitrogen or are present sufficiently in the water used in the process. Generally, however, it is advisable to supplement the minerals normally present by adding yeast extract, vitamin extracts and inorganic cations and anions.

Various formulations comprising media which have been found useful in supporting growth of the organisms are as follows:

MEDIUM I

| | | |
|---|---|---|
| Corn steep liquor | ml | 6 |
| Ammonium dihydrogen phosphate | g | 3 |
| Calcium carbonate | g | 2½ |
| Soya bean oil | g | 2.2 |
| Yeast extract (Difco) | g | 2½ |
| Dextrose | g | 10 |

Water, q.s. to 1 liter.

MEDIUM II

| | | |
|---|---|---|
| Sodium nitrate | g | 2 |
| Potassium phosphate (tribasic) | g | 1 |
| Magnesium sulfate heptahydrate | g | 0.5 |
| Yeast extract (Difco) | g | 1 |
| Potassium chloride | g | 0.5 |
| Dextrose | g | 50 |
| Water | liter | 1 | pH adjusted to 5.0.

MEDIUM III

| | | |
|---|---|---|
| Malt extract | g | 20 |
| Peptone | g | 1 |
| Dextrose | g | 20 |
| Distilled water | liter | 1 |

MEDIUM IV

| | | |
|---|---|---|
| Edamin (Sheffield) | g | 20 |
| Corn steep liquor | g | 3 |
| Dextrose | g | 50 |

Tap water, q.s. to 1 liter.
pH adjusted 4.3 to 4.5.

Many other types of nutrient media can be prepared according to methods well-known in the art.

In general, the fungus is grown in the nutrient medium for periods ranging from 3 to 10 days depending upon the particular species, generally in flasks on a rotary shaker. After the growth period the mycelium is collected and homogenized with transfers being made aseptically. The fermentation flasks contain the same medium as that used to culture the organism. Growth is permitted to continue in the fermentation flasks for a period of 2 to 4 days after which time a steroid substrate is added. The fungi, especially the Rhizoctonia, grow at all temperatures between 20 and 36° C. and it is possible to effect the oxidation process within these ranges, we prefer, however, to employ temperature ranges between 23 and 28° C. During the fermentation process aeration may be provided by forcing sterile air through the mixture or in the case of shake flasks sufficient oxygen is obtained from the air above the surface of the liquid medium. If necessary, antifoaming agents such as silicones glyceride oils and the like may be added from time to time.

The steroid, although preferably added as a solution in ethanol or methanol or other water-miscible solvents, will generally precipitate from the solution upon admixture of the fermentation medium. Upon precipitation, it is dispersed throughout the medium as a fine suspension and it is thus readily available to the organism for oxidation. The concentration of steroid added to the fermentation may be as high as 5.0 g. per liter, but is generally in the order of 0.1 to 1.0 gram per liter of medium.

At the conclusion of the fermentation process, the oxygenated steroid is recovered from the fermentation medium by extractive methods and chromatographic technics later described.

The progress of a fermentation or the products obtained from a fermentation are partially identifiable by paper chromatographic technics. It is known to employ known steroids as standards and compare their migration with an unknown. In general, the different steroids can be identified by their position on the chromatographic strips.

Although we have found that organisms of the order Mycelia-Sterilia and especially of the genera Rhizoctonia and sclerotium produce oxygenation at one or more of three positions comprising C-1, C-2 and C-11, we have found that certain species under particular conditions produce a predominance of one or at the most two of the oxygenated products. For example, we have found that *Rhizoctonia ferrugena* (A.T.C.C. 13246T) preferentially converts Compound S into 1-hydroxy Compound S and 2β-hydroxy Compound S with only trace quantities of 11-oxygenation taking place. On the other hand, *Rhizoctonia solani* from Gossypium sp. C.B.S. (also A.T.C.C. 13250T.) in Medium I described heretofore, transforms Compound S principally into 1-hydroxy Compound S; *Rhizoctonia solani* from Citrus sp. C.B.S. and (also A.T.C.C. 13249T) *Rhizoctonia solani* var. *lycopersici* C.B.S. do similarly. We have found that we can preferentially produce a predominance of a 2β-hydroxyl product by using Rhizoctonia sp. from *Triticum vulgaris* C.B.S. (also A.T.C.C. 13245T). For 11-oxygenation we prefer to use Rhizoctonia sp. N.R.R.L. 2573; *Sclerotium rolfsii* A.T.C.C. 12450 produces practically equivalent quantities of 1-hydroxylated and 11α-hydroxylated products.

Although one cannot predict with certainty just exactly what position will be oxygenated to the greatest extent, i.e. which of the 1-, 2- or 11-positions are more susceptible to oxygenation by a particular species or strain, it will be apparent from the examples and from the present state of the art that simple paper chromatographic analysis readily affords one with identifying data. Wherein we have indicated above that 2-hydroxylation occurs preferably, we do not infer that no hydroxylation occurs at 1 or 11, these hydroxylations also occur, but to a lesser degree.

As stated heretofore, a convenient method for analysis for the oxygenated steroid products and the separation of these products in purified form is the method of column chromatography using various adsorbents. Although a variety of adsorbents may be used, such as the various aluminas, silica gels and the like, we prefer especially to treat silicic acid so as to obtain a more active adsorbent and one which will permit greater ease in partition of components. We prepare our adsorbent as follows: Mallinckrodt silicic acid batch No. 2847 is activated by washing same twice with equal volumes of acetone and is dried preferably under a heating lamp. For a higher degree of activity, the silicic acid is first washed with an acetone-ether (3:1) solution and then dried. The chromatographic column is prepared by agitating the silicic acid with anhydrous, alcohol-free chloroform and pouring the mixture into a glass column so designed to produce a silicic acid bed at least twice as high as its diameter. Since a given quantity of adsorbent can only adsorb a finite quantity of steroid, we have found that for a 3 g. mixture of steroids, 15 g. of silicic acid produces a very adequate column.

The adsorbent is thoroughly agitated to insure removal of suspended air bubbles and to produce a fine dispersion. The excess diluent is drained from the column and the sample steroid mixture is applied in chloroform solution.

The sample steroid mixtures are obtained from solvent extraction of the fermentation broths and followed by evaporation in vacuo leaving a residue consisting of the mixed steroid products. The residue is thoroughly dried over phosphorous pentoxide in vacuo and is dissolved in anhydrous alcohol-free chloroform. The solutions are filtered to remove insoluble contaminants and then applied directly to the column of silicic acid. The volume of chloroform used to solubilize the steroid residue does not appear to be critical.

In view of the fact that the silicic acid column, prior to adsorption of the steroid substrate, has a transparent glass-like appearance, the progress of adsorption and elution is easily followed. The adsorption of steroids produces distinct opaque bands at the site of adsorption. Thus, upon elution the opaque band can be observed during its passage through the transparent column bed.

The development of the column may be made by a gradient elution technic whereby chloroform and the chloroform solutions possessing increasing quantities of absolute methanol are passed through the silicic acid bed. Otherwise, the column may be developed by passage of chloroform and methanol in chloroform solutions over the silicic acid bed wherein the changes in methanol concentration are made manually.

In general, with chloroform development, the most lipophilic or non-polar steroids are eluted first with the more polar steroids being eluted by solutions containing the increased quantities of methanol.

The following examples are given by way of illustration and are not intended as a limitation of this invention. It will be apparent to one skilled in the art that there are more widely different embodiments of the present invention of which the following examples are but a few. It is to be understood, therefore, that the invention is only limited as defined in the appended claims.

In the fermentation methods described below, it is understood that sterile conditions are maintained with the various media being first sterilized by usual methods such as autoclaving prior to growth of the organism and that all transfers are made under aseptic conditions.

EXAMPLE 1

*Conversion of Compound S to 1-hydroxy S and 2β-hydroxy S*

A culture of *Rhizoctonia ferrugena* C.B.S. (also A.T.C.C. 13246T) having been first grown on a Sabouraud dextrose agar slant was cultivated by adding a distilled water suspension of the organism to 50 ml. of sterile Medium No. 1 contained in each of fifteen 250 ml. shake flasks. The shaking process was carried out on a rotary shaker, having a diameter of rotation of two inches and operated at 280 r.p.m. The organism was permitted to grow during this first stage for a period of 7 days at a temperature of 23–28° C. After the growth period the contents of the flasks were pooled and homogenized in a previously sterilized Waring Blendor. 50 ml. of the homogenized mycelium were added to each of fifteen 2 l. shake flasks, each containing 400 ml. of Medium No. 1 with the entire operation being carried out under aseptic conditions. The culture was incubated for an additional forty-eight hours after which time 200 mg. of Compound S in 4 ml. of 80% ethanol were added to each flask and fermentation on the rotary shaker was carried out at 23° for five days. After the fermentation period, the contents of the flasks were pooled and the mycelium was separated from the liquid portion and then washed with distilled water. The mycelium and the liquid portion were separately extracted with chloroform followed by chloroform-methanol (4:1). The extracts were combined and concentrated to dryness in vacuo at temperatures not exceeding room temperature. The residue was taken up in anhydrous alcohol-free chloroform and the resultant solution was chromatographed on a silicic acid adsorption column described above. A methanol-chloroform gradient elution according to the procedure of Lakshmanan et al., Arch. Biochem. Biophys. 53: 258 (1954), was followed to separate the two steroidal transformation products and residual substrates. Starting material was collected in the first fractions, a compound later identified as 2β-hydroxy Compound S in the middle fractions and a compound later identified as 1-hydroxy Compound S in the last fractions. Homogeneity of each group of eluates was indicated by paper chromatography according to technics well-known in the art. Crystallization of the middle fractions from chloroform-ether yielded 34 mg. of 2β-hydroxy S (4-pregnene-2β,17α,21-triol-3,20-dione), M.P. 214–220° C. dec. Further recrystallization from acetone-hexane raised the M.P. to 220–

222° dec. A sample for analytical purposes was recrystallized many times from acetone-hexane and had a M.P. of 225.5–228° dec., $[\alpha]_D^{25}$ —58° (dioxane), $\lambda_{max.}^{MeOH}$ 243 m$\mu$ ($\epsilon$=14,500), $\lambda_{max.}^{Nujol}$ 3.01$\mu$ (OH), 5.81$\mu$ (20-carbonyl), 5.94$\mu$ (3-carbonyl), 6.18$\mu$ ($\Delta^4$)

and 3-hydroxyl groups by integration of the OH band. We found that a polymorphic modification of the above compound exists which possesses an altered infrared spectrum in Nujol, $\lambda$max 2.8$\mu$, 5.82$\mu$, 5.89$\mu$, and 6.02$\mu$. This polymorph is converted into its above crystalline isomer by recrystallization from acetone-hexane utilizing a seed of the isomer. The infrared spectra of each of the two forms is markedly different from either the 6$\beta$, 11$\alpha$, 11$\beta$, 15$\alpha$ or 15$\beta$-hydroxy derivatives of Compound S.

Carbon and hydrogen analyses were within the limits of experimental error. Upon reaction with acetic anhydride and pyridine, the 2,21-diacetate was obtained, M.P. 218–219°, $[\alpha]_D^{25}$+9° (dioxane), $\lambda_{max.}^{MeOH}$ 244 m$\mu$ ($\epsilon$=16,200), $\lambda_{max.}^{Nujol}$ 2.73, 2.83, 2.97, 5.71, 5.78, 5.95, 5.15, 8.06 and 8.25$\mu$ The structure of the substance was determined on the basis of the following: The appearance of the conjugated carbonyl band at 5.94$\mu$ is indicative of a hydrogen bond interaction between the 3-carbonyl and a hydroxyl group on an adjacent carbon atom. This is substantiated by the observed interaction of the neighboring acetate of the diacetate as well. Carbon atom number 4 is excluded as a site for the hydroxyl group by virtue of the observed ultra-violet absorption maximum, since enols of $\alpha,\beta$-diketones absorb in the region of 280 m$\mu$. Measurement of the U.V. absorption in alkaline solution, according to Meyer, J. Org. Chem. 20: 1240 (1955), after heating at 60° for 4 hours, afforded a U.V. absorption curve which corresponds exactly in location of maxima with the highly characteristic curve resulting from 2$\alpha$-hydroxy-4-androstene-3,17-dione. The 2-hydroxylated product of this fermentation differs from the known 2$\alpha$-hydroxy S whose constants are M.P. 219–221°, $[\alpha]_D^{25}$ +130°. Similarly, the diacetate of the hydroxy compound differs from the 2,21-diacetate of 2$\alpha$-hydroxy Compound S whose constants are $[\alpha]_D^{25}$ +122° (chloroform), M.P. 200–202°, 215–127° (polymorphs). Since it is known that a 2$\beta$-hydroxyl equilibrates with a 2$\alpha$-hydroxyl group in mild alkaline solution according to Sondheimer et al., J.A.C.S. 75: 4712 (1953), it is obvious that the same alkaline ultra-violet spectrum must result for both configurations in a given pair of 2-hydroxy-3-keto-$\Delta^4$-steroids. Thus, the middle fraction steroid must contain the 2$\beta$-hydroxyl group.

Further corroboration is found in the fact that the predicted shift in molecular rotation ($\Delta$M–581) based upon the findings of Sondheimer et al. with the only 2$\beta$-hydroxy-3-keto-$\Delta^4$-steroid heretofore known, 2$\beta$-hydroxytestosterone-2,17-diacetate, is in reasonable agreement with the observed values of the shift for the 21-acetate of Compound S vs. the diacetate obtained above ($\Delta$M–500). Finally, since Sondheimer et al. have shown that hydroxyl groups at the 2- or 6-positions in 3-keto-$\Delta^4$-steroids can be removed reductively by mild treatment with zinc and acetic acid, we carried out such treatment upon our diacetate converting same into Compound S 21-acetate which was indistinguishable in the infrared from an authentic sample.

The crystallization of the last group of fractions isolated from the fermentation mixture afforded 55 mg. of crystalline material M.P. 180–200° C. dec. Recrystallization from acetone-hexane without application of heat raised the melting point to 193–207° C. dec. (with a transition occurring at about 170°). The following physical characteristics were observed $[\alpha]_D^{25}$ +89° (dioxane) (corrected for acetone of solvation), $\lambda_{max.}^{MeOH}$ 241 m$\mu$ ($\epsilon$=16,500, corrected for acetone of solvation), $\lambda_{max.}^{Nujol}$ 2.83, 5.81, 6.04, 6.18$\mu$ (one additional polymorphic variety has been observed).

*Analysis.*—Calc'd for $C_{21}H_{30}O_5 \cdot C_3H_5O$: C, 68.54; H, 8.63. Found: C, 68.41; H, 8.66.

The identity of the foregoing substance was established as 1-hydroxy S according to the following: Integration of the hydroxyl bands of the infrared spectrum confirmed the presence of three hydroxyl groups. Measurement of the U.V. spectrum in alkaline solution according to the methods of Meyer, loc. cit., showed a shift in the maximum from 241 m$\mu$ to 245 m$\mu$; however, no peak appeared in the 380 m$\mu$ region after two hours at 60°. This is consistent with the conversion of a 1-hydroxy-3-keto-$\Delta^4$-steroid into a $\Delta^{1,4}$-diene-3-ketosteroid, which transformation would be expected to occur under such conditions. Furthermore, the U.V. spectrum in alkaline solution was markedly different from that of a 2-hydroxy-3-keto-$\Delta^4$-steroid. The presence of the 3-keto-$\Delta^{1,4}$-diene system from the alkaline treatment was substantiated by the measurement of the polarographic reduction potential of the solution, according to Kabasakalian et al., Anal. Chem. 28: 1669 (1956). The observed shift in half-wave potential from 1.46 volts (before alkaline treatment) to 1.31 volts (after alkaline treatment), a shift of .15 volt, corresponds well to the shifts observed for cortisone vs. prednisone (0.16 volt) and cortisol vs. prednisolone (0.17 volt). Furthermore, a sample of the purified crystalline solid, obtained from the last group of eluates, upon pyrolysis at the melting point for ten minutes yielded a mixture of products whose infrared spectrum contained the characteristic $\Delta^{1,4}$-diene-3-one bands.

As final proof, a solution of the crystals of the last fraction of the eluates in chloroform was treated at room temperature with a trace amount of concentrated hydrochloric acid for two hours. Upon concentration in vacuo and recrystallization from acetone-hexane there was obtained 1,4-pregnadiene - 17$\alpha$,21 - diol-3,20-dione, M.P. 237–240° C. whose M.P. and infrared spectrum were identical with that of an authentic sample.

From the foregoing, it is concluded that the substance obtained was 1-hydroxy Compound S with the configuration of the 1-hydroxyl group as yet unknown.

EXAMPLE 2

*Further transformations with Rhizoctonia ferrugena on various substrates*

Experiments were carried out identical to the method of Example 1 except for a change in substrate. Specifically, fermentations were effected upon testosterone, progesterone, corticosterone, hydrocortisone, cortisone, desoxycorticosterone, 9$\alpha$-fluorohydrocortisone, $\Delta^{4,9(11)}$-pregnadiene-17$\alpha$,21-diol-3,20-dione, 4-pregnene-11$\alpha$,17$\alpha$,21-triol-3,20-dione, 6$\alpha$-methyl-9$\alpha$-fluorohydrocortisone, 6$\alpha$-methylhydrocortisone, 16$\alpha$-hydroxy-9$\alpha$-fluorohydrocortisone. Chromatographic analysis was carried out on a papergram in each of the runs using Whatman No. 4 paper in a solvent system consisting of the following:

| | Parts |
|---|---|
| Toluene | 9 |
| Ethyl acetate | 1 |
| Methanol | 5 |
| Distilled water | 5 |

The adsorbent papers were first wetted in a 70% aqueous acetone mixture prior to development. In all cases, two major products were observed as in the case of papergram analysis in Example 1. In the case of the testosterone experiment, the less polar spot was identical in migratory rate with that produced by a standard of known 2$\beta$-hydroxy testosterone.

Each of the fermentation runs were processed according to Example 1 and chromatographed on a silicic acid column. Identification of hydroxylation at the 1-, 2$\beta$-positions was carried out according to the technics described in the preceding example.

EXAMPLE 3

11-oxygenation using Rhizoctonia sp. N.R.R.L. 2573

A culture of Rhizoctonia sp. N.R.R.L. 2573 was grown on Sabouraud dextrose agar medium. A suspension of the growth, obtained by washing the surface of the agar slant with distilled water, was used to inoculate a sterile medium having the composition of Medium No. 1, as hereinabove defined. The first stage growth period was carried out in shake flasks for 64 hours at 28° C. Aseptic transfers were then made to two fermentation flasks containing the same growth medium and after 48 hours of growth, 25 mg. of Compound S in 0.75 ml. of 80% ethanol were added to each flask. The mixtures were shaken for 2 days during which time steroid transformation was permitted to take place. At the end of the fermentation, 6 ml. of methylisobutyl ketone were added to each flask and the extracts were prepared by shaking the entire contents for 30 minutes. Samples of the extracts were spotted on Whatman No. 4 filter paper and the sheets were chromatographed in a solvent system described in Example 2. Two major products were observed which were identical chromatographically with spots produced by standards prepared from hydrocortisone and its 11α-epimer. Two additional components were noted, one being more polar than hydrocortisone and the other less so, said components being identified as 1-hydroxy Compound S and cortisone, respectively.

The experiment was repeated using the same culture of Rhizoctonia and the same media. 50 ml. of the inoculum obtained from the first stage growth were added to each of ten 2 liter flasks each containing 400 ml. of Medium No. 1. The flasks and contents were shaken on a reciprocating shaker at 72 strokes per minute, at 28° C. for 48 hours, after which time 200 mg. of Compound S in 4 ml. of 80% ethanol were added to each flask. Samples taken after 20 hours of fermentation showed transformation into four products identifiable on paper chromatograms employing the toluene-ethyl acetate-methanol-water system. After a total fermentation time of 24 hours, the contents of the 10 flasks were pooled and extracted with two liters of chloroform. The extraction was repeated four additional times with one liter of chloroform per extraction. The pooled extracts were washed with one-half volume of 2% sodium bicarbonate solution, then with one-half volume of distilled water and finally concentrated to a residue in vacuo. Separation of the products in the residue was effected by adsorption on a silicic acid column using chloroform and chloroform-methanol solutions as eluates as described in Example 1. The crystals obtained from each fraction of eluate were identified by melting point, ultraviolet, infrared adsorption spectra and comparison with authenic samples as being hydrocortisone, 4-pregnene-11α,17α,21-triol-3,20-dione, cortisone, and 1-hydroxy Compounds S.

In similar manner, fermentations were carried out in other media such as yeast extract 1%, cerelose 1%, distilled water 100 ml., or soybean meal 15 g., glucose 10 g., soybean oil 2.2 g., calcium carbonate 2.5 g., distilled water q.s. to 1 liter.

By substituting Rhizoctonia solani from B. cauliflora C.B.S. (also A.T.C.C. 13248T), there was obtained similar products; like results were obtained with Sclerotium oryzae var. irregularis. Other species of Rhizoctonia, especially solani A.T.C.C. 10154, 10157, 10187, muneratii C.B.S. (also A.T.C.C. 13247T) and Sclerotium rolfsii A.T.C.C. 12450 cultivated in a manner similar to that described above produced predominantly 11-epi-hydrocortisone and 1-hydroxy Compound S when Compound S was employed as substrate. By substituting testosterone or progesterone or desoxycorticosterone, there was obtained predominantly the respective 1-hydroxy and 11α-hydroxy derivatives with traces of 11β-hydroxy and 11-keto substitution occurring.

EXAMPLE 4

Fermentation producing predominantly 1-hydroxylation

By cultivating Rhizoctonia solani from gossypium sp. C.B.S. (also A.T.C.C. 13250T) in Medium No. 1, as described in Example 3 and using Compound S as substrate, there was obtained principally 1-hydroxy Compound S identified paper chromatographically and by column separation as described in the preceding example.

Similar results were obtained with Rhizoctonia solani from citrus sp. C.B.S. (also A.T.C.C. 13249T). Rhizoctonia solani var. lycopersici C.B.S. produced predominantly 1-hydroxylation as indicated by paper chromatogram analysis.

The following table shows various transformations which have been effected upon different substrates with the products identified either by known paper chromatographic technics or by procedures heretofore described. The organisms referred to in the table by number are identified as follows:

(1) R. ferrugena C.B.S. (also A.T.C.C. 13246T)
(2) R. solani from Gossypium sp. C.B.S. (also A.T.C.C. 13250T)
(3) R. solani from citrus sp. C.B.S. (also A.T.C.C. 13249T)
(4) R. sp. from Triticum vulgaris C.B.S. (also A.T.C.C. 13245T)
(5) R. sp. N.R.R.L. 2573
(6) R. solani from B. cauliflora C.B.S. (also A.T.C.C. 13248T)
(7) R. solani A.T.C.C. 10157, 10187
(8) Sclerotium rolfsii A.T.C.C. 12450
(9) Sclerotium oryzae var. irregularis
(10) Rhacodium cellare C.B.S. (also A.T.C.C. 13243T)

POSITION OF ADDED OXYGEN FUNCTION IN MAIN PRODUCT(S)

| Substrate | Organism | | | | | | | | | |
|---|---|---|---|---|---|---|---|---|---|---|
| | 1 | 2 | 3 | 4 | 5 | 6 | 7 | 8 | 9 | 10 |
| Compound S | 1, 2β | 1 | 1, 2β | 2β, 11α | 11α, 11β, 11-keto | 11α, 11β, 11-keto | 1, 11α | 1, 11α | 1, 11α, 11β | 11α |
| Cortisone | 1, 2β | 1, 2β | 1, 2β | 2β | 1 | 1 | | | | |
| Cortisone acetate | 1, 2β | 1, 2β | 1, 2β | 2β | 1 | 1 | | | | |
| Hydrocortisone | 1, 2β | 1, 2β | 1, 2β | 2β | 1 | 1 | | | | |
| Testosterone | 1, 2β | 1, 2β | 1, 2β | 2β, 11α | 11α, 11β | 11α, 11β | | | 11α, 11β | |
| 9α-Fluorohydrocortisone | 1, 2β | | | 1, 2β | | | | | | |
| 4-Pregnene-11α, 17α, 21-triol-3, 20-dione | 1, 2β | 1, 2β | | | | | | | | |
| Progesterone | 1, 2β | 1, 2β | 1, 2β | 2β, 11α | 11α, 11β | 11α, 11β | 1, 11α | | 11α, 11β | |
| 1, 4-Pregadiene-17α, 21-diol-3, 20-dione | | | | | 11α, 11β, 11-keto | 11α, 11β, 11-keto | | | | |
| 6-Methyl Compound F | 1, 2β | | 1, 2β | | | | | | | |
| 16α-Hydroxyhydrocortisone | 1, 2β | | 1, 2β | | | | | | | |

As stated heretofore, our processes are applicable to the oxygenation of steroids in general, provided said steroids are devoid of substituents other than hydrogen at one or more of positions 1, 2 or 11, although we prefer to employ steroids containing 3-keto-delta-4 system since such system is commonly present in most therapeutically active steroids. This structural restriction is not mandatory. Our process works equally well with compounds such as pregnenolone, 16-dehydropregnenolone, dihydroprogesterone, dihydrocortisone, and the like.

The operating examples described above solely for purposes of simplicity have been limited to the use of free sterols as substrates. This is not to be construed as a mandatory limitation, for one can equally well employ esters, ethers and ketol derivatives of the various substrates in the oxygenation process. For example, in place of Compound S there may be employed Compound S 21-acetate, in place of cortisone or hydrocortisone, there may be employed likewise their respective 21 esters. The esters which may be employed as substrates are not limited necessarily to lower alkanoyl esters, but may be any alkyl residue which is non-toxic to the organism such as acetates, propionates, cyclopentylpropionates, furoates, phenoxyacetates, tertiary-butylacetates, hemisuccinates, phosphates, and the like.

Conversely, when an unesterified steroid is applied as substrate, it may be transformed into any one of the foregoing esters which are useful therapeutically and well-known in the art, such as reacting the steroid with an acylating agent such as an acid anhydride or halide in the presence of an acid acceptor such as pyridine or other tertiary bases.

As stated heretofore, the steroids so obtained by our process, are either therapeutically active per se or are useful intermediates in the preparation of therapeutically active substances according to transformations well-known in the art. The further oxygenated analogs obtained from our processes are also useful as wetting agents due to their plurality of hydroxyl groups. They thus may be employed in the formation and maintenance of stable emulsions.

We claim:

1. A process for the oxygenation of steroids, which comprises dispersing a steroid, containing at least one member selected from the group consisting of 1-methylene, 2-methylene, and 11-methylene groups, in an aqueous nutrient medium containing assimilable nitrogen and carbohydrate, and subjecting such dispersed steriod to the oxygenating action produced by growing a species of fungus selected from the group consisting of the genera Rhizoctonia and Sclerotium in said medium under agitated aerobic fermentation conditions, so as to introduce an oxygen function which, when said oxygen function is —OH, is introduced into at least one of the positions selected from the group consisting of the 1, 2$\beta$, and 11$\alpha$ and 11$\beta$ positions, and when said oxygen function is =O, then at the 11 position, and isolating the thus produced further oxygenated product.

2. The process of claim 1, wherein the fungus is of the genus Rhizoctonia.

3. The process of claim 1, wherein the fungus is of the genus Sclerotium.

4. The process of claim 1, wherein the oxygenated product having the same number of carbon atoms in the carbon to carbon skeleton of the starting steroid is recovered by solvent extraction.

5. The process of claim 1, wherein the starting steroid has a two carbon side chain at the seventeen position.

6. A process for the introduction of oxygen into a steroid, which comprises contacting a steroid substrate consisting essentially of steroid, under aerobic fermentation conditions, with the oxygenating activity of a species of fungus selected from the group consisting of the genera Rhizoctonia and Sclerotium to produce an oxygenated steroid, in which the carbon-to-carbon skeleton of the resulting oxygenated steriod is the same as to the number and arrangement of carbon atoms as the carbon-to-carbon skeleton of the starting steroid, so as to introduce an oxygen function which, when said oxygen function is —OH, is introduced at at least one of the positions selected from the group consisting of the 1, 2$\beta$, and 11$\alpha$ and 11$\beta$ positions, and when said oxygen function is =O, then at the 11 position.

7. A process for the introduction of oxygen into a steroid, which comprises aerobically contacting a steroid having a methylene group, with a growing fungus selected from the group consisting of the genera Rhizoctonia and Sclerotium, in the presence of an aqueous nutrient medium comprising assimilable nitrogen and carbohydrate, so as to introduce an oxygen function which, when said oxygen function is —OH, is introduced at at least one of the positions selected from the group consisting of the 1, 2$\beta$, and 11$\alpha$ and 11$\beta$ positions, and when said oxygen function is =O, then at the 11 position, and separating the resulting oxygenated steriod.

8. The process of claim 7, wherein the fungus is of the genus Rhizoctonia.

9. The process of claim 7, wherein the fungus is of the genus Sclerotium.

10. The process of claim 7, wherein the starting steroid contains up to and including 22 carbon atoms in the carbon to carbon skeleton.

11. The process of claim 7, wherein the starting steriod is a 4-pregnene-17$\alpha$,21-diol-3,20-dione.

12. The process of claim 7, wherein the starting steroid is Reichstein's Compound S.

13. The process of claim 7, wherein the starting steriod is cortisone.

14. The process of claim 7, wherein the starting steroid is hydrocortisone.

15. The process of claim 7, wherein the starting steroid is 1,4-pregnadiene-17$\alpha$,21-diol-3,20-dione.

16. The process of claim 7, wherein the starting steroid is progesterone.

17. The process of claim 7, wherein the starting steroid is testosterone.

18. The process of claim 7, wherein the starting steroid is corticosterone.

19. A process comprising dispersing a steroid having a two carbon atom side chain at the seventeen position and at least one member selected from the group consisting of 1-methylene, 2-methylene and 11-methylene groups, in an aqueous nutrient medium containing assimilable nitrogen and carbohydrate, growing a species of fungus selected from the group consisting of Rhizoctonia and Sclerotium in said medium under agitated aerobic fermentation conditions so as to introduce an oxygen function which, when said oxygen function is —OH, is introduced at at least one of the positions selected from the group consisting of the 1, 2$\beta$, and 11$\alpha$ and 11$\beta$ positions, and when said oxygen function is =O, then at the 11 position, and isolating the thus produced further oxygenated product.

20. The process in accordance with claim 1, in which said oxygen function is an hydroxyl group.

21. The process in accordance with claim 1, in which said oxygen function is a keto group and is introduced at the 11 position in the steroid.

References Cited in the file of this patent

UNITED STATES PATENTS

| | | |
|---|---|---|
| 2,649,400 | Murray et al. | Aug. 18, 1953 |
| 2,649,402 | Murray et al. | Aug. 18, 1953 |
| 2,658,023 | Shull et al. | Nov. 3, 1953 |
| 2,793,163 | Thoma et al. | May 31, 1957 |
| 2,802,775 | Dulaney et al. | Aug. 13, 1957 |

OTHER REFERENCES

Reese et al.: Quartermaster Culture Collection, Farlowia, December 1950, page 46.